Figures 1, 2, 3:
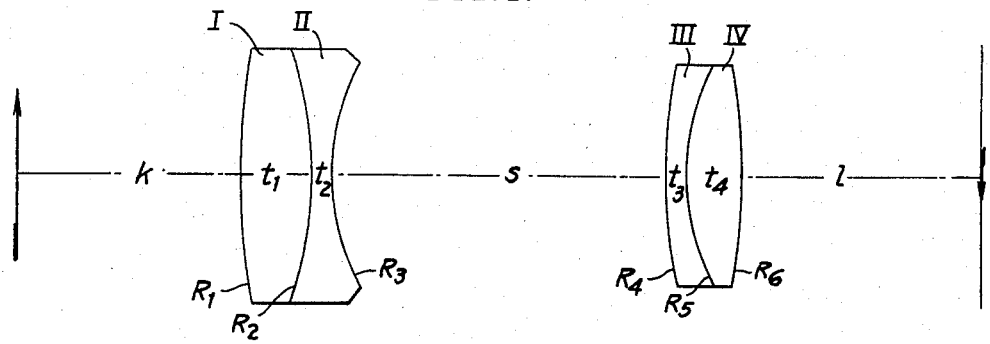

May 9, 1950  R. KINGSLAKE  2,507,164
REVERSE TELEPHOTO LENS FOR ENLARGERS
Filed Dec. 17, 1948

| EF = 100 mm. | | | | Mag. = 3x |
|---|---|---|---|---|
| LENS | N | V | RADII | THICKNESSES |
| I | 1.734 | 51.1 | $R_1$ = +188.93 mm. | k = 231.5 mm. |
| II | 1.517 | 64.5 | $R_2$ = −69.72 | $t_1$ = 13.12 |
|  |  |  | $R_3$ = +41.82 | $t_2$ = 3.50 |
| III | 1.617 | 36.6 | $R_4$ = +116.08 | $S_1$ = 197.88 |
| IV | 1.517 | 64.5 | $R_5$ = +43.74 | $t_3$ = 3.26 |
|  |  |  | $R_6$ = −109.12 | $t_4$ = 10.60 |
|  |  |  |  | l = 224.1 |

| EF = 100 mm. | | | | Mag. = 2½x |
|---|---|---|---|---|
| LENS | N | V | RADII | THICKNESSES |
| I | 1.734 | 51.1 | $R_1$ = +107.68 mm. | k = 199.25 mm. |
| II | 1.523 | 58.6 | $R_2$ = −55.48 | $t_1$ = 9.32 |
|  |  |  | $R_3$ = +33.14 | $t_2$ = 2.87 |
| III | 1.617 | 36.6 | $R_4$ = +116.40 | $S_1$ = 156.31 |
| IV | 1.517 | 64.5 | $R_5$ = +39.48 | $t_3$ = 2.87 |
|  |  |  | $R_6$ = −85.15 | $t_4$ = 9.32 |
|  |  |  |  | l = 202.8 |

RUDOLF KINGSLAKE
INVENTOR
BY Harold F. Bennett
ATTORNEY & AGENT

Patented May 9, 1950

2,507,164

UNITED STATES PATENT OFFICE 2,507,164

REVERSE TELEPHOTO LENS FOR ENLARGERS

Rudolf Kingslake, Rochester, N. Y., assignor to Eastman Kodak Company, Rochester, N. Y., a corporation of New Jersey Application December 17, 1948, Serial No. 65,865

6 Claims. (Cl. 88—57)

This invention relates to reverse telephoto objectives, that is objectives comprising a negative member facing the longer conjugate and a positive member spaced therefrom and facing the shorter conjugate.

The object of the invention is to provide a reverse telephoto lens consisting of only two cemented doublets which is highly corrected for spherical aberration, coma, curvature of field, distortion, and color.

A particular object of the invention is to provide an objective for copying at magnifications of about 2× to about 5× which is mounted roughly midway between the two conjugate planes.

Offhand, it might seem that a reverse telephoto objective is merely a telephoto objective mounted backwards in the camera. Such a direct reversal of parts is very unsatisfactory, however, because the aberrations are not well corrected. In particular, the coma, field curvature, and spherical aberration are bad and cause an unsharpness in the image which shows up principally as a comatic flare at points off the axis.

Reverse telephoto objectives usually have a greater airspace between the two members and require surface curvatures for the most part in quite a different range from those found in telephoto objectives. In particular, the positive member is usually closer to the shape of an equiconvex lens, and the negative member is usually closer to the shape of a plano-concave lens.

According to the present invention a reverse telephoto objective for projecting an image at a magnification in the range from about 2× to about 5× and corrected for spherical aberration, coma, distortion and curvature of field at a magnification in this range is made up consisting of a front meniscus negative doublet and a rear biconvex positive doublet separated by an airspace between 0.9 F. and 4 F. in length. The negative meniscus doublet consists of a front biconvex element having a refractive index between 1.66 and 1.84 and a biconcave element cemented thereto having a refractive index lower than that of the biconvex element by between 0.15 and 0.30. It is more essential for this difference in index to be within this range than it is for either index individually to be within any particular range if the distortion is to be corrected. The positive doublet consists of a meniscus negative element having a refractive index between 1.58 and 1.70 and a biconvex element cemented to the rear thereof having a refractive index lower than that of the meniscus element by between 0.07 and 0.20. It is essential to have this difference in index within this range to correct the spherical aberration and to keep the zonal spherical aberration within moderate bounds.

It is usually more convenient and sometimes quite necessary to mount a copying lens roughly midway between the two conjugate planes. This is particularly true if two or more lenses working at different magnifications are to be interchangeable and if the distance between the conjugate planes is to remain fixed or only slightly adjustable. To meet these requirements, a symmetrical objective is the natural type to select for unit magnification and magnifications up to about two, but for a magnification greater than two an ordinary type lens could not be mounted near the midway point. In the range of magnifications from two to about five, I have found that a reverse telephoto objective according to the invention can be mounted about midway between the conjugate planes and gives a sharp flat image.

Such an objective is, as already mentioned, made up of two separated members. The powers of the two members are given by the following equations in which K is the distance from the long conjugate object or image plane to the front principal point of the front or negative member, S is the optical separation, that is the distance from the rear principal point of the front member to the front principal point of the rear member, L is the distance from the rear principal point of the rear member to the short conjugate image or object plane, P is the power of the whole objective, and $p_1$ and $p_2$ are the powers of the front and rear member respectively. The equations are:

$$P = \frac{M}{K} + \frac{1}{LM} - \frac{S}{KL}$$

$$p_1 = \frac{1}{K} + \frac{1}{S} - \frac{LM}{KS} = \frac{(S+K)LM - L^2M^2}{(LM-S)SM+KS} P$$

$$p_2 = \frac{1}{L} + \frac{1}{S} - \frac{K}{LSM} = \frac{(S+L)KM - K^2}{(LM-S)SM+KS} P$$

An important practical case is that in which $K=L=S$, as this is near the maximum useful value of S in many practical applications. In this case, $$P=\frac{1}{S}\left(M+\frac{1}{M}-1\right)$$

$$p_1=\frac{1}{S}(2-M)=\frac{2-M}{M+\frac{1}{M}-1}P$$

$$p_2=\frac{1}{S}\left(2-\frac{1}{M}\right)=\frac{2-\frac{1}{M}}{M+\frac{1}{M}-1}P$$

whereby, when M varies from 2 to 5, P varies from $1.5/S$ to $4.2/S$, $p_1$ varies from zero to $-0.715P$, and $p_2$ varies from P to $0.428P$. This does not necessarily mean that M is varied during use, but that objectives may be designed for varying values of M within this approximate range.

Another practical case is that in which $K=L=2S$, which is near what I have found to be the minimum practicable value of S. If $K+L+S$ (approximately the distance between conjugate planes) is to be the same as before, then S is six-tenths as great as in the previous case. In this case $$P=\frac{1}{2S}\left(M+\frac{1}{M}-\frac{1}{2}\right)$$

$$p_1=\frac{1}{2S}(3-2M)=\frac{3-2M}{M+\frac{1}{M}-\frac{1}{2}}P$$

$$p_2=\frac{1}{2S}\left(3-\frac{2}{M}\right)=\frac{3-2/M}{M+\frac{1}{M}-\frac{1}{2}}P$$

whereby $p_1$ varies from $-0.50P$ to $-1.49P$ and $p_2$ varies from P to $0.55P$.

I have found it preferable to make K slightly greater than L but not more than about 30% greater and that this arrangement permits making each member somewhat weaker in most instances than in the case of $K=L$. A simple rule which approximately expresses the limits between which the powers of the two members should lie is given in the following algebraic inequalities:

$$-0.4+0.2M<-p_1/P<+0.5+0.2M$$

and $$1.1-0.16M<p_2/P<1.35-0.16M$$

From this it may be seen that the power $p_1$ of the negative member is relatively stronger for higher magnifications, and that the power $p_2$ of the positive member is relatively weaker.

I have found that a high degree of correction can be obtained with the above arrangement of lens elements and powers by making the radii of curvature $R_1$ to $R_6$ of the six surfaces (as numbered from front to rear) within the following preferred ranges which in some cases depend, as do the powers of the members, upon the magnification at which the objective is to be used:

$$(1.4M-2.6)F < R_1<(1.8M-2.6)F$$
$$(0.2M-0.2)F <-R_2<(0.4M-0.2)F$$
$$(0.1M-0.05)F< R_3<(0.1M+0.25)F$$
$$F< R_4<1.5F$$
$$0.3F< R_5<0.6F$$
$$(0.5M-0.6)F <-R_6<(0.5M-0.1)F$$

As examples of these preferred limits to the radii of curvature and the limits to the powers $p_1$ and $p_2$ described in the preceding paragraph, numerical values for magnifications of 2, 3, 4 and 5 are given in the following table in terms of a ratio to the focal length F or the power P of the objective:

| Magnification | 2 | 3 | 4 | 5 |
|---|---|---|---|---|
| *Radii* | | | | |
| $+R_1/F$ from | 0.2 | 1.6 | 3.0 | 4.4 |
| to | 1.0 | 2.8 | 4.6 | 6.4 |
| $-R_2/F$ from | .2 | .4 | .6 | .8 |
| to | .6 | 1.0 | 1.4 | 1.8 |
| $+R_3/F$ from | .15 | .25 | .35 | .45 |
| to | .45 | .55 | .65 | .75 |
| $+R_4/F$ from | 1.0 | 1.0 | 1.0 | 1.0 |
| to | 1.5 | 1.5 | 1.5 | 1.5 |
| $+R_5/F$ from | .3 | .3 | .3 | .3 |
| to | .6 | .6 | .6 | .6 |
| $-R_6/F$ from | .4 | .9 | 1.4 | 1.9 |
| to | .9 | 1.4 | 1.9 | 2.4 |
| *Powers* | | | | |
| $p_1/P$ from | 0.0 | -0.2 | -0.4 | -0.6 |
| to | -0.9 | -1.1 | -1.3 | -1.5 |
| $p_2/P$ from | 0.78 | 0.62 | 0.46 | 0.30 |
| to | 1.03 | 0.87 | 0.71 | 0.55 |

The extreme preferred range of each radius is given by the smaller limit for magnification 2 and the larger limit for magnification 5.

In the accompanying drawing,

Fig. 1 is a diagrammatic axial section of an objective according to the invention.

Fig. 2 gives data for an objective working at $3\times$ magnification.

Fig. 3 gives data for a similar objective working at $2\frac{1}{2}\times$ magnification.

The data given in Figs. 2 and 3 are repeated here for convenience, the focal length being 100 mm. in each case:

*Example 1, Figs. 1 and 2*

| Lens | N | V | Radii | Thicknesses |
|---|---|---|---|---|
| I | 1.734 | 51.1 | $R_1=+188.93$ mm. | $k=231.5$ mm. |
| II | 1.517 | 64.5 | $R_2=-69.72$ | $t_1=13.12$ |
| | | | $R_3=+41.82$ | $t_2=3.50$ |
| III | 1.617 | 36.6 | $R_4=+116.08$ | $s=197.88$ |
| IV | 1.517 | 64.5 | $R_5=+43.74$ | $t_3=3.26$ |
| | | | $R_6=-109.12$ | $t_4=10.60$ |
| | | | | $l=224.1$ |

*Example 2, Figs. 1 and 3*

| Lens | N | V | Radii | Thicknesses |
|---|---|---|---|---|
| I | 1.734 | 51.1 | $R_1=+107.68$ mm. | $k=199.25$ mm. |
| II | 1.523 | 58.6 | $R_2=-55.48$ | $t_1=9.32$ |
| | | | $R_3=+33.14$ | $t_2=2.87$ |
| III | 1.617 | 36.6 | $R_4=+116.40$ | $s=156.31$ |
| IV | 1.517 | 64.5 | $R_5+39.48$ | $t_3=2.87$ |
| | | | $R_6=-85.15$ | $t_4=9.32$ |
| | | | | $l=202.8$ |

In these tables, as in the drawings the lens elements are numbered from front to rear in the first column, the corresponding refractive indices N for the D line of the spectrum and the conventional dispersive indices V are given in the second and third columns and the radii of curvature R of the lens surfaces, the thicknesses t of the lens elements, each numbered by subscripts from front to rear, and the conjugate distances k and l and the separation s of the two components are given in the last two columns.

The important optical characteristics of these two examples are set forth in the following table:

|   | Example 1 | Example 2 |
|---|---|---|
| M | 3.0 | 2.5 |
| $p_1$ | −0.490P | −0.441P |
| $p_2$ | +0.764P | +0.870P |
| k | 231.5 mm. | 199.2 mm. |
| K | 251.5 | 220.4 |
| S | 193.6 | 148.6 |
| l | 224.1 | 202.8 |
| L | 228.3 | 210.8 |
| $N_1-N_2$ | 0.217 | 0.211 |
| $N_3-N_4$ | 0.100 | 0.100 |

The symbols in this table have all been previously defined.

It will be evident from these tables that each of these objectives embodies all the features of the invention. In Example 1, $p_1$ is between −0.2P and −1.1P and $p_2$ is between +0.62P and +0.87P as preferred for objectives used at a magnification of 3. Also in Example 2, $p_1$ is between −0.1P and −1.0P and $p_2$ is between +0.70P and +0.95P as preferred for objectives used at a magnification of 2½. Similarly, each radius of curvature is within the preferred range for the respective magnification.

I claim:

1. A reverse telephoto objective corrected for use at a magnification M in the range from 2× to 5× consisting of a front meniscus negative doublet facing the long conjugate and a rear biconvex positive doublet separated therefrom by an airspace between 0.9F and 4F in length where F is the focal length of the objective, the front doublet consisting of a front biconvex element having a refractive index between 1.66 and 1.80 and a biconcave element cemented thereto having a refractive index lower than that of the front element by between 0.15 and 0.30, and the rear doublet consisting of a front negative meniscus element having a refractive index between 1.58 and 1.70 and a biconvex element cemented thereto having a refractive index lower than that of the meniscus element by between 0.07 and 0.20, the power of the front doublet being $$\frac{(S+K)LM-L^2M^2}{(LM-S)SM+KS}P$$

and that of the rear doublet being $$\frac{(S+L)KM-K^2}{(LM-S)SM+KS}P$$

where K is the distance from the long conjugate plane to the front principal point of the front doublet, L is the distance from the rear principal point of the rear doublet to the short conjugate plane, S is the distance from the rear principal point of the front doublet to the front principal point of the rear doublet, and M is the magnification at which the objective is used, and P is the power of the objective, and where K is between L and 1.3L and S is between $(K+L)/4$ and $(K+L)/2$.

2. A reverse telephoto objective corrected for use at a magnification M in the range from 2× to 5× consisting of a front meniscus negative doublet facing the long conjugate and a rear biconvex positive doublet separated therefrom by an airspace between 0.9F and 4F in length where F is the focal length of the objective, the front doublet consisting of a front biconvex element having a refractive index between 1.66 and 1.80 and a biconcave element cemented thereto having a refractive index lower than that of the front element by between 0.15 and 0.30, and the rear doublet consisting of a front negative meniscus element having a refractive index between 1.58 and 1.70 and a biconvex element cemented thereto having a refractive index lower than that of the meniscus element by between 0.07 and 0.20, the power of the front doublet being $$\frac{(S+K)LM-L^2M^2}{(LM-S)SM+KS}P$$

and that of the rear doublet being $$\frac{(S+L)KM-K^2}{(LM-S)SM+KS}P$$

where K is the distance from the long conjugate plane to the front principal point of the front doublet, L is the distance from the rear principal point of the rear doublet to the short conjugate plane, S is the distance from the rear principal point of the front doublet to the front principal point of the rear doublet, and M is the magnification at which the objective is used, and P is the power of the objective, and where the radii of curvature R of the six refractive surfaces of the objective numbered by subscripts from front to rear are within the limits set forth in the following algebraic inequalities:

$$(1.4M-2.6)F<R_1<(1.8M-2.6)F$$
$$(0.2M-0.2)F<R_2<(0.4M-0.2)F$$
$$(0.1M-0.05)F<R_3<(0.1M+0.25)F$$
$$F<R_4<1.5F$$
$$0.3F<R_5<0.6F$$
$$(0.5M-0.6)F<R_6<(0.5M-0.1)F$$

3. A reverse telephoto objective corrected for use at a magnification M in the range from 2× to 5× consisting of a front meniscus negative doublet facing the long conjugate and a rear biconvex positive doublet separated therefrom by an airspace between 0.9F and 4F in length where F is the focal length of the objective, the front doublet consisting of a front biconvex element having a refractive index between 1.66 and 1.80 and a biconcave element cemented thereto having a refractive index lower than that of the front element by between 0.15 and 0.30, and the rear doublet consisting of a front meniscus element having a refractive index between 1.58 and 1.70 and a biconvex element cemented thereto having a refractive index lower than that of the meniscus element by between 0.07 and 0.20, the ratios of the powers $p_1$ and $p_2$ of the front and rear doublets to the power P of the whole objective being between the limits indicated by the following algebraic inequalities:

$$-0.4+0.2M<-p_1/P<+0.5+0.2M$$
$$+1.1-0.16M<+p_2/P<+1.35-0.16M$$

where M is the magnification at which the objective is used.

4. An objective according to claim 3 in which the radii of curvature R of the six refractive surfaces numbered by subscripts from front to rear are within the limits set forth by the following algebraic inequalities:

$$0.2F<R_1<6.4F$$
$$0.2F<R_2<1.8F$$
$$0.15F<R_3<0.75F$$
$$F<R_4<1.5F$$
$$0.3F<R_5<0.6F$$
$$0.4F<R_6<2.4F$$

5. An objective consisting of two cemented doublets and made substantially according to the specifications set forth in the following table:

| Lens | N | V | Radii | Thicknesses |
|---|---|---|---|---|
| I | 1.73 | 51 | $R_1=+1.9F$ | $t_1=0.1F$ |
| II | 1.52 | 64 | $R_2=-0.7F$ | $t_2<0.05F$ |
|  |  |  | $R_3=+0.4F$ | $s=2F$ |
| III | 1.62 | 37 | $R_4=+1.2F$ | $t_3<0.05F$ |
| IV | 1.52 | 64 | $R_5=+0.4F$ | $t_4=0.1F$ |
|  |  |  | $R_6=-1.1F$ |  | where the four lens elements are numbered from front to rear in the first column, the corresponding refractive indices N for the D wavelength and the conventional dispersive indices V are given in the next two columns, and the radii of curvature, the thicknesses $t$, each numbered by subscripts from front to rear, and the airspace $s$ are given in the last two columns, the $+$ and $-$ values of R indicating surfaces respectively convex and concave to the front, and where F is the focal length of the objective.

6. An objective consisting of two cemented doublets and made substantially according to the specifications set forth in the following table:

| Lens | N | V | Radii | Thicknesses |
|---|---|---|---|---|
| I | 1.73 | 51 | $R_1=+1.1F$ | $t_1=0.1F$ |
| II | 1.52 | 59 | $R_2=-0.6F$ | $t_2<0.05F$ |
|  |  |  | $R_3=+0.3F$ | $s=1.6F$ |
| III | 1.62 | 37 | $R_4=+1.1F$ | $t_3<0.05F$ |
| IV | 1.52 | 64 | $R_5=+0.4F$ | $t_4=0.1F$ |
|  |  |  | $R_6=-0.9F$ |  | where the four lens elements are numbered from front to rear in the first column, the corresponding refractive indices N for the D wavelength and the conventional dispersive indices V are given in the next two columns, and the radii of curvature R, the thicknesses $t$, each numbered by subscripts from front to rear, and the airspace $s$ are given in the last two columns, the $+$ and $-$ values of R indicating surfaces respectively convex and concave to the front, and where F is the focal length of the objective.

RUDOLF KINGSLAKE.

REFERENCES CITED

The following references are of record in the file of this patent:

UNITED STATES PATENTS

| Number | Name | Date |
|---|---|---|
| 1,085,868 | Konig | Feb. 3, 1914 |
| 1,897,896 | Frederick et al. | Feb. 14, 1933 |
| 2,231,699 | Bennett | Feb. 11, 1941 |

FOREIGN PATENTS

| Number | Country | Date |
|---|---|---|
| 550,519 | Great Britain | Jan. 12, 1943 |

Certificate of Correction

Patent No. 2,507,164                                      May 9, 1950

RUDOLF KINGSLAKE

It is hereby certified that errors appear in the printed specification of the above numbered patent requiring correction as follows:

Column 3, lines 37 to 39, inclusive, for that portion of the equation reading $\left(3-\frac{2}{M}\right)-$ read $\left(s-\frac{2}{M}\right)=$ column 4, line 62, in the table, fourth column thereof, for "R5+39.48" read $R5=+39.48$; column 6, line 48, after the word "front" insert *negative*;

and that the said Letters Patent should be read with these corrections therein that the same may conform to the record of the case in the Patent Office.

Signed and sealed this 15th day of August, A. D. 1950.

[SEAL]

THOMAS F. MURPHY,
*Assistant Commissioner of Patents.*